(12) United States Patent
Narsimhan et al.

(10) Patent No.: US 8,484,676 B1
(45) Date of Patent: Jul. 9, 2013

(54) ATTENTION-BASED, MULTI-SCREEN ADVERTISEMENT SCHEDULING

(71) Applicant: General Instrument Corporation, Horsham, PA (US)

(72) Inventors: Nitya Narsimhan, Hopewell Junction, NY (US); Venugopal Vasudevan, Palatine, IL (US); Jehan Wickramasuriya, St. Charles, IL (US); Joseph F. Wodka, Hoffman Estates, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/682,946

(22) Filed: Nov. 21, 2012

(51) Int. Cl.
*H04N 7/10* (2006.01)
*H04N 7/025* (2006.01)

(52) U.S. Cl.
USPC ............. 725/34; 725/12; 725/13; 725/23; 725/46; 725/121; 725/133; 725/141; 725/153; 348/734; 705/14.43; 705/14.52; 705/14.53; 705/14.67; 705/14.68; 705/319

(58) Field of Classification Search
None
See application file for complete search history.

(56) References Cited

U.S. PATENT DOCUMENTS

| | | | |
|---|---|---|---|
| 6,282,713 B1 * | 8/2001 | Kitsukawa et al. | 725/36 |
| 7,194,754 B2 * | 3/2007 | Tomsen et al. | 725/60 |
| 7,360,232 B2 * | 4/2008 | Mitchell | 725/112 |
| 7,861,260 B2 * | 12/2010 | Shkedi | 725/34 |
| 8,060,904 B1 | 11/2011 | Evans et al. | |
| 2001/0013125 A1 * | 8/2001 | Kitsukawa et al. | 725/36 |
| 2002/0026359 A1 | 2/2002 | Long et al. | |
| 2002/0059590 A1 * | 5/2002 | Kitsukawa et al. | 725/36 |
| 2002/0104086 A1 * | 8/2002 | Tomsen et al. | 725/42 |
| 2002/0162121 A1 * | 10/2002 | Mitchell | 725/135 |
| 2003/0018969 A1 | 1/2003 | Humpleman et al. | |
| 2004/0226034 A1 * | 11/2004 | Kaczowka et al. | 725/9 |
| 2005/0060745 A1 | 3/2005 | Riedl et al. | |
| 2006/0271995 A1 * | 11/2006 | Hagawa et al. | 725/135 |
| 2007/0094083 A1 | 4/2007 | Yruski et al. | |
| 2007/0260521 A1 | 11/2007 | Van Der Riet | |
| 2008/0127246 A1 | 5/2008 | Sylvain | |
| 2008/0276270 A1 | 11/2008 | Kotaru et al. | |
| 2009/0132339 A1 | 5/2009 | Sloo et al. | |

(Continued)

OTHER PUBLICATIONS

Abby Kaassen: "Podbridge Aims to Put Fresh Ads in Time-shifted Content", Ad Age digital, Ad & Marketing News, published Aug. 1, 2006, http://adage.com/article/digital/podbridge-aims-put-fresh-ads-time-shifted-content/110835/, all pages.

(Continued)

*Primary Examiner* — Jason J Chung

(57) ABSTRACT

An advertisement system includes an advertising manager that receives a content-event indicator, which indicates playback of an advertisement for viewing on a first display screen at a media-playback device or indicates playback of recorded content that includes advertisements. The advertising manager can determine an optimal time offset as a duration of time before or after playback of an advertisement to the start of an event that is associated with the advertisement for viewing on a second display screen at a mobile device. For recorded content, an optimization schedule is determined that replaces and time-shifts advertisements during playback of the recorded content. The advertising manager can also determine a fulfillment criterion for a product or service based on latency constraints to indicate a duration of time within which fulfillment of the product or service is expected when offered as a second advertisement corresponding to a first advertisement.

3 Claims, 8 Drawing Sheets

U.S. PATENT DOCUMENTS

| | | | |
|---|---|---|---|
| 2010/0046606 A1 | 2/2010 | Celik et al. | |
| 2010/0211439 A1* | 8/2010 | Marci et al. | 705/10 |
| 2010/0299187 A1 | 11/2010 | Duggal | |
| 2011/0016498 A1 | 1/2011 | Tsuria et al. | |
| 2011/0106744 A1 | 5/2011 | Becker et al. | |
| 2011/0161998 A1* | 6/2011 | Alberth et al. | 725/10 |
| 2011/0270653 A1 | 11/2011 | Gupta et al. | |
| 2012/0096486 A1 | 4/2012 | Stallard et al. | |
| 2012/0102233 A1 | 4/2012 | Shah et al. | |
| 2012/0297406 A1* | 11/2012 | Bartholomay et al. | 725/9 |
| 2013/0014136 A1* | 1/2013 | Bhatia et al. | 725/9 |
| 2013/0014137 A1* | 1/2013 | Bhatia et al. | 725/9 |
| 2013/0014138 A1* | 1/2013 | Bhatia et al. | 725/9 |
| 2013/0014141 A1* | 1/2013 | Bhatia et al. | 725/10 |
| 2013/0014143 A1* | 1/2013 | Bhatia et al. | 725/13 |
| 2013/0014144 A1* | 1/2013 | Bhatia et al. | 725/13 |
| 2013/0014145 A1* | 1/2013 | Bhatia et al. | 725/13 |
| 2013/0014146 A1* | 1/2013 | Bhatia et al. | 725/14 |
| 2013/0019258 A1* | 1/2013 | Bhatia et al. | 725/13 |
| 2013/0055300 A1* | 2/2013 | Hanina | 725/10 |

OTHER PUBLICATIONS

Mediamind: 02 Dual Screen Case Study for Million Pound Drop, http://www.mediamind.com/resource/o2-dual-screen-case-study-million-pound-drop, downloaded from internet: Nov. 15, 2012, all pages.

SecondScreen Networks, The Ad Platform for the Second Screen, http://www.mediamind.com/resource/o2-dual-screen-case-study-million-pound-drop, downloaded from internet: Nov. 15, 2012, all pages.

DG Announces Pioneering Dual-Screen Video Ad Platform, press release: DG—Mon., Apr. 16, 2012, http://www.mediamind.com/resource/o2-dual-screen-case-study-million-pound-drop, all pages.

\* cited by examiner

ATTENTION-BASED, MULTI-SCREEN ADVERTISEMENT SCHEDULING

CROSS-REFERENCE TO RELATED APPLICATIONS

The present application is related to U.S. patent application Ser. Nos. 13/682,978 and 13/683,003, filed on an even date herewith.

TECHNICAL FIELD

The present disclosure is related generally to digital-media services and, more particularly, to advertisement placement.

BACKGROUND

The traditional notion of watching broadcast television at home has evolved into many different forms of viewing television content, on many different devices. For example, users can watch live and recorded television content, such as television programs, advertisements, sporting events, and movies on various display devices, to include televisions, computer displays, entertainment devices, and even mobile devices, such as tablets and mobile phones. Additionally, users are increasingly on-line more than ever and commonly multi-task while watching television content. For example, a viewer may be watching a television program or sporting event on a first-screen device, such as a television, while dividing his attention to also focus on a second screen device, such as a mobile phone supporting a text conversation with a friend or a tablet device with an email application. The viewer may be likely to pay more attention to the television (e.g., first-screen device) when the content is engaging, such as a scoring play in a sporting event, and then turn attention to the mobile device (e.g., second screen device) when the content is less interesting.

Multi-tasking around television viewing is creating both opportunities and challenges for multi-screen user experiences. While advertisers continue to devote a majority of their advertising budget to traditional television media, the advertisers also recognize that viewers are increasingly using and paying attention to second screen devices while watching television. Advertisers are developing advertising campaigns that attempt to capture viewer attention with related advertisements, both in the traditional "first-screen" television media and on the "second screen" mobile devices, where a first-screen advertisement triggers a content-related second screen advertisement or other event.

However, the synchronization of a first-screen advertisement with a second screen advertisement is a coordination challenge. A first-screen advertisement is more likely to be effective in capturing viewer attention when the television content is engaging, whereas a second screen advertisement is likely to be missed by the viewer while his or her attention remains on the first-screen device. Alternatively, a second screen advertisement or event is more likely to be seen by the viewer when the television content on the first-screen device is less interesting and his or her attention is on the second screen device. However, the viewer is more likely to miss a first-screen advertisement while focused on the second screen device.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
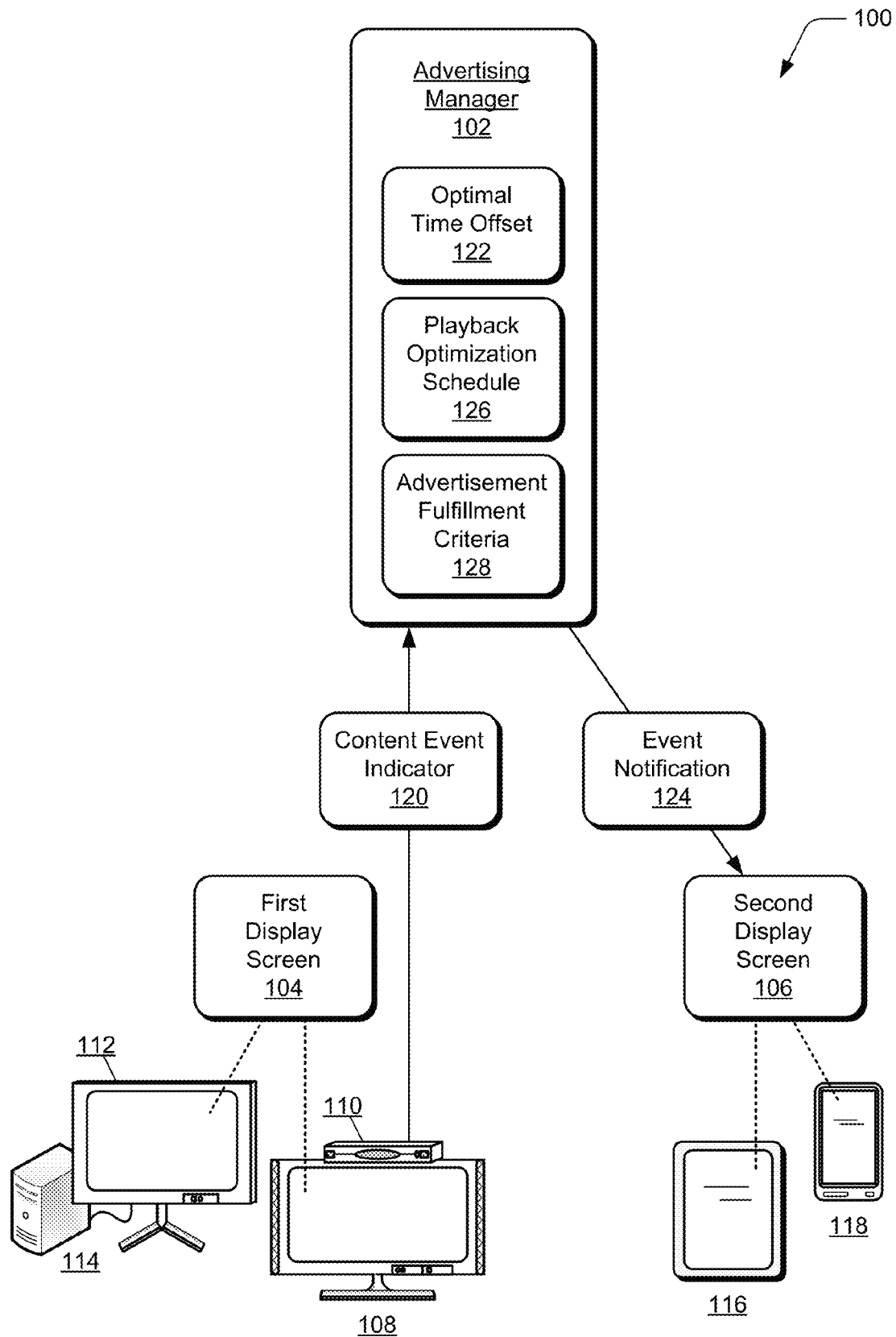
FIG. 1 illustrates an example system in accordance with one or more embodiments.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Embodiments of advertisement scheduling and correlation are described with reference to various advertisement systems. An advertiser can implement an advertising campaign that seeks to capture viewer attention with related advertisements, both in the traditional first-screen television media and on second-screen mobile devices, where a first-screen action or advertisement triggers a content-related second-screen display event, interaction-based event, or other advertisement for display.

Generally, a first-screen event, such as an advertisement or product placement in a television program or movie (also referred to as an "anchor"), can trigger a coordinated, synchronized, or content-related second-screen action, such as another advertisement or event, alert, application update, or image displayed. Coordinated advertising provides a value-added opportunity for content providers and advertisers, and a second-screen event or advertisement can be scheduled to correspond to a first-screen event, thereby providing a screen-multiplier effect known to increase brand awareness or advertisement fulfillment.

In embodiments of attention-based, multi-screen advertisement scheduling, an advertising manager is implemented to determine an optimal time offset that is a duration of time between a first-screen action or advertisement and the start of a content-related, second-screen event that is associated with the first-screen action or advertisement. The optimal time offset can be determined to initiate the second-screen event before or after the first-screen action or advertisement so that the first-screen action and the second-screen event do not directly compete for viewer attention. However, the optimal time offset can be determined within an acceptable end limit so that the viewer will still likely make the cognitive and contextual connection between the first-screen action and the second-screen event.

In embodiments of attention-based advertisement scheduling in time-shifted content, the advertising manager is implemented to determine a playback optimization schedule for recorded content (e.g., time-shifted content) that is initiated for playback at a media-playback device. The recorded content includes advertisements in respective timeslots within the recorded content, and the playback optimization schedule can include replacing or time-shifting advertisements to an alternate timeslot during the playback of the recorded content. The advertising manager can also determine the playback optimization schedule based in part on an optimal time offset that is a duration of time between a first-screen action or advertisement and a content-related, second-screen event that is associated with advertisement playback in the recorded content.

In embodiments of multi-screen advertisement correlation based on purchases, the advertising manager is implemented to determine advertisement-fulfillment criteria for a product or service based on latency constraints received from a provider of the product or service. The advertisement-fulfillment criteria indicate a duration of time within which fulfillment of the product or service is expected when offered as a second-screen advertisement that corresponds to a first-screen action or advertisement.

While features and concepts of advertisement scheduling and correlation can be implemented in any number of different devices, systems, configurations, or networks, embodiments of advertisement scheduling and correlation are described in the context of the following example devices, systems, and methods.

FIG. 1 illustrates an example system 100 that can be implemented in accordance with any of the embodiments, aspects, and features of the various advertisement systems described herein. The example system 100 is representative of the advertisement systems shown and described with reference to FIGS. 2, 4, and 6. Generally, the advertisement systems include an advertising manager 102 that manages aspects and features of multi-screen advertisement scheduling and correlation. The advertising manager 102 may commonly be referred to as an advertisement-campaign manager. As an advertiser, a provider of a product or service may initiate an advertising campaign that seeks to capture viewer attention with related advertisements, both in the traditional first-screen television media and on second-screen mobile devices, where a first-screen action or advertisement triggers a content-related second-screen event or advertisement for display, such as an alert, application update, or displayed image. In implementations, a first-screen advertisement may be video content, and a second-screen event is an image display or interaction-based event.

In this example, the system 100 includes a first display screen 104 and a second display screen 106. The first display screen 104 may be a television device 108 that is connected to a media-playback device 110, such as a television set-top box or digital video recorder. A television device 108 may also include integrated components as a media-playback device. The first display screen 104 may also be a computer display device 112, such as connected to a computer device 114. A computing device 114 may also include an integrated display screen, such as a laptop computer, through which a viewer can receive and watch television content, such as television programs, advertisements, sporting events, movies, and the like. The second display screen 106 may be any type of portable or mobile device, such as a tablet 116 or mobile phone 118, on which a user can view a content-related second-screen action, such as another advertisement, event, alert, application update, or displayed image.

In the advertisement systems, the advertising manager 102 can receive a content-event indicator 120 from any of the various first-screen, media-playback devices. In embodiments of attention-based, multi-screen advertisement scheduling, the content-event indicator 120 indicates an event, such as playback of an advertisement for viewing or that an advertisement will playback for viewing, on the first display screen 104 at a media-playback device. The advertising manager 102 is implemented to determine an optimal time offset 122 that is a duration of time before the advertisement will playback or the optimal time offset from playback of the advertisement to the start of an event that is associated with the advertisement. An event notification 124 can then be communicated to a mobile device to initiate the event for viewing at the optimal time offset on the second display screen 106 at the mobile device. This is described in further detail with reference to FIGS. 2 and 3.

In embodiments of attention-based advertisement scheduling in time-shifted content, the advertising manager 102 receives the content-event indicator 120 that indicates playback of recorded content for viewing at a media-playback device, and the recorded content includes advertisements in respective timeslots within the recorded content. The advertising manager 102 is implemented to determine a playback optimization schedule 126 that includes replacing or time-shifting advertisements to an alternate timeslot during the playback of the recorded content. The playback optimization schedule 126 is then communicated to the media-playback device 110 to reschedule or replace the advertisements during playback of the recorded content. This is described in further detail with reference to FIGS. 4 and 5.

In embodiments of multi-screen advertisement correlation based on purchases, the advertising manager 102 determines advertisement-fulfillment criteria 128 for a product or service based on latency constraints received from a provider of the product or service. The advertisement-fulfillment criteria indicate a duration of time within which fulfillment of the product or service is expected when offered as a second advertisement corresponding to a first-screen action or advertisement. The advertising manager 102 receives the content-event indicator 120 that indicates playback of the first advertisement for viewing on the first display screen 104 at the media-playback device 110. The event notification 124 can then be communicated to the mobile device to initiate the second advertisement that includes the fulfillment criteria for viewing on the second display screen 106 at the mobile device. This is described in further detail with reference to FIGS. 6 and 7.

Figure 2:
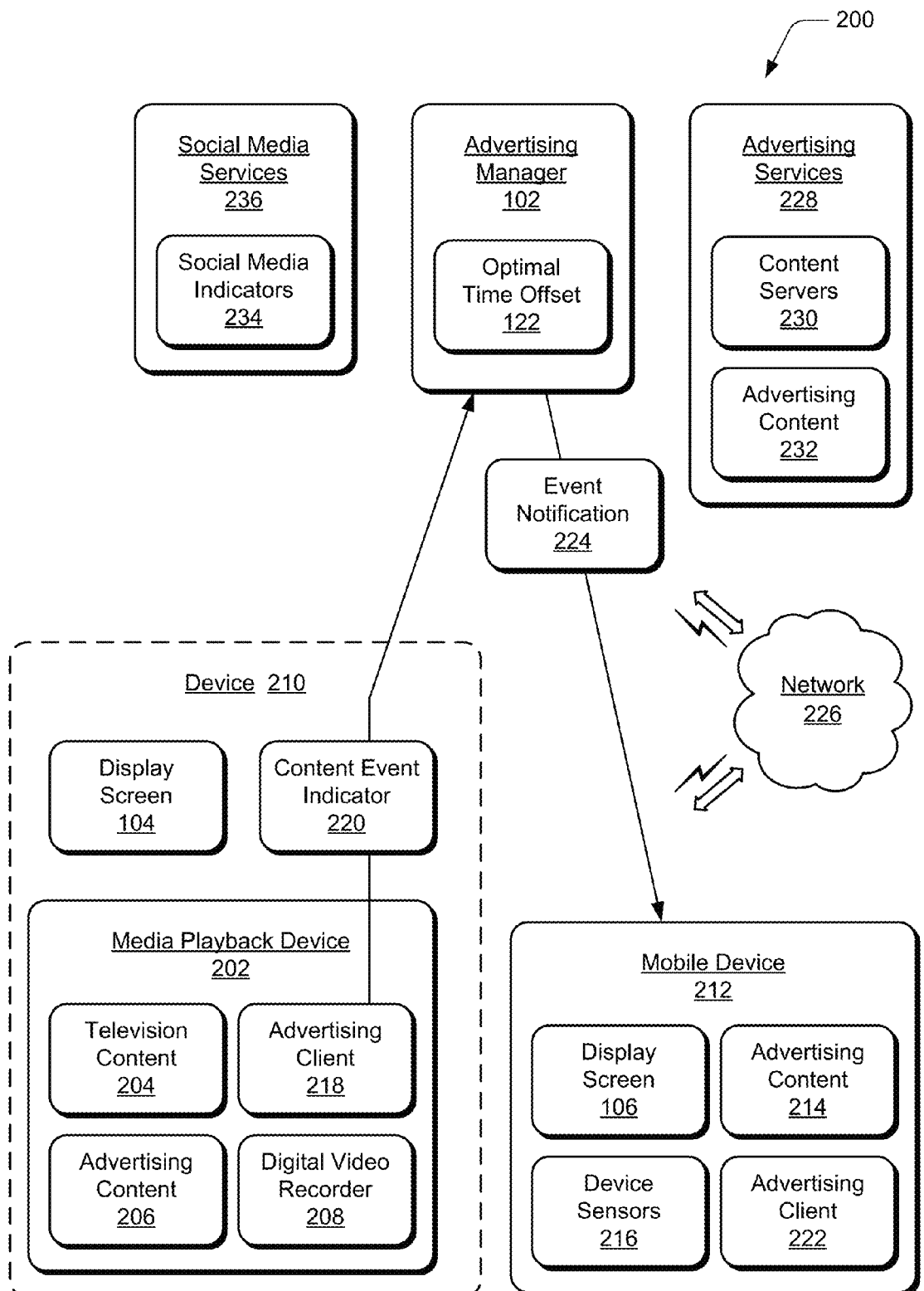
FIG. 2 illustrates an example advertisement system in which embodiments of attention-based, multi-screen advertisement scheduling can be implemented.

FIG. 2 illustrates an example advertisement system 200 in which embodiments of attention-based, multi-screen advertisement scheduling can be implemented. The example advertisement system 200 includes the advertising manager 102 that determines the optimal time offset 122 and the first display screen 104 and the second display screen 106 as described with reference to FIG. 1. This example advertisement system 200 also includes a media-playback device 202, such as any type of television set-top box, computer device, gaming system, or entertainment device that can be utilized to receive and playback television content 204 and advertising content 206. The media-playback device 202 may also implement a digital video recorder 208 to record and store recorded content. The digital video recorder 208 can record the television content 204 along with the advertising content 206 when initially distributed (e.g., as broadcast or multicast content).

In implementations, a device 210 may include the media-playback device 202 integrated with the display screen 104, such as a television device that includes integrated components of a media-playback device 202 to receive and playback television content for viewing.

The example advertisement system 200 also includes a mobile device 212, such as a tablet device or mobile phone, that includes the display screen 106, which can be utilized for viewing advertising content 214 along with other types of television and media content. Additionally, the media-playback device 202, device 210, or the mobile device 212 can be implemented with various components, such as processing and memory devices, as well as with any combination of components as further described with reference to the example device shown in FIG. 8. For example, media-playback devices or mobile devices may include a data interface or tuner that tunes to a television channel frequency over which the television and advertising content is delivered. The devices may also include a media player that is implemented to manage content playback at the device or a media rendering system to playback the television and advertising content for viewing.

The display screen 104, the media-playback device 202, and the device 210 are collectively referred to as the first display screen or first-screen device throughout embodiments described herein. The display screen 106 and the mobile device 212 are collectively referred to as the second display screen or second-screen device throughout embodiments described herein. As described with reference to FIG. 1, an advertiser (e.g., a provider of a product or service) may initiate a multi-screen advertising campaign seeking to capture viewer attention with related advertisements or events, both at a first-screen device and at a second-screen device (also referred to as a companion device). In implementations, the mobile device 212 may also include any type of device sensors 216 that detect device position (e.g., a user viewable position) or device use to indicate that a user is engaged with the device 212 and likely to see a second-screen, content-related advertisement or other event.

The media-playback device 202 and the mobile device 212 each include an advertising client, such as a software application or component that is downloaded and installed on the device and is executable by a processing system on the respective device. An advertising client 218 at the media-playback device 202 is implemented to communicate with the advertising manager 102, such as to communicate a content-event indicator 220 to the advertising manager 102 to indicate an event, such as playback of an advertisement for viewing or that an advertisement will playback for viewing, on the first display screen 104 at the media-playback device 202. Similarly, an advertising client 222 at the mobile device 212 is implemented to communicate with the advertising manager 102, such as to receive an event notification 224 from the advertising manager 102 to initiate an event (e.g., a second-screen advertisement, displayed image, alert, etc.) for viewing on the second display screen 106 at the mobile device 212.

Any of the devices and servers described herein can communicate via a network 226, which can be implemented to include a wired or a wireless network. The network 226 can also be implemented using any type of network topology or communication protocol and can be represented or otherwise implemented as a combination of two or more networks, to include IP-based networks or the Internet. The network may also include mobile-operator networks that are managed by a mobile-network operator or other network operators, such as a communication-service provider, cell-phone provider, or Internet-service provider.

The example advertisement system 200 includes advertising services 228 that implement content servers 230 to distribute advertising content 232 to the various devices, such as the advertising content 206 to the media-playback device 202 and the advertising content 214 to the mobile device 212. The advertising services 228 are representative of any number of different advertising agencies or advertisement services that may implement an advertising campaign for an advertiser (e.g., a provider of a product or service) and can be implemented on a network of one or more server devices. For example, an advertiser may engage an advertising service 228 to develop both first display screen and second display screen content-related advertisements and events. Alternatively, a first-screen advertisement may be provided by an advertiser as the advertising content 206 at the media-playback device 202, while a coordinated second-screen advertisement is provided by a different advertiser as the advertising content 214 at the mobile device 212.

In some implementations, the advertising manager 102 may be implemented as an independent device or service (e.g., as shown) or may be implemented as an integrated component or service of the advertising services 228. Alternatively or in addition, the advertising manager 102 can be implemented as a network-based service (e.g., in the cloud) to implement embodiments of advertising scheduling and correlation as described herein.

Although not shown, any of the advertisement systems shown and described herein can include a television-content distribution system with media-content servers that distribute the television content 204 to the media-playback device 202 as well as any other type of audio, video, or image data in the form of television programming, movies, on-demand video, interactive games, advertisements, and the like to the media-playback and mobile devices. A media-content distribution system may be commonly referred to as a headend that distributes the media content (e.g., the television and advertising content) via a cable television system or as multicast IP (e.g., also commonly referred to as broadband television, or as Internet television). Any of the described server devices that are implemented for the advertising services 228 or a television-content distribution system can be implemented with various components, such as processing and memory devices, as well as with any combination of components as further described with reference to the example device shown in FIG. 5. For example, a content distributor includes storage media, such as any type of memory or suitable electronic data storage, to store or to otherwise maintain the media content and other data.

In some embodiments, the advertising manager 102 receives the content-event indicator 220 from the advertising client 218 at the media-playback device 202 to indicate a first-screen device event, such as playback of an advertisement for viewing on the first display screen 104 at the media-playback device 202. The content-event indicator 220 can indicate that the advertisement has been played back for viewing, has started playback, or will playback for viewing on the first display screen 104 at the media-playback device 202. The advertising client 218 at the media-playback device 202 can be implemented to determine a first-screen device event based on closed captions, audio-format detection, video or audio analysis, or by other available techniques.

The advertising manager 102 is implemented to compute a first-screen attention profile from a combination of content characteristics and social reaction to the television content 204 to identify when viewers are more and less interested (also referred to as peaks and valleys of collective user attention) in the first-screen device television content 204. The advertising manager 102 can receive social-media indicators 234 from any number of various social-medias 236, such as "tweets," "likes," "check ins," etc., that indicate a level of viewer attention to television content that includes the first display screen advertisement. The social-media indicators 234 can be used to model real-time collective viewer interest in first-screen device content, and the determined viewer interest can be combined with historical profiles to predict upcoming peaks and valleys in viewer attention. In addition, the advertising manager 102 may also receive advertiser-designated time durations that are advertiser preferences of the time duration between the advertisement playback on the first display screen 104 at the media-playback device 202 and the event for viewing on the second display screen 106 at the mobile device 212.

The advertising manager 102 can then determine the optimal time offset 122 from the time of playback of the advertisement to a start of a content-related event that is associated with the advertisement. An event that is initiated for viewing on the second display screen 106 at the mobile device 212 can be a coordinated advertisement with the first-screen advertisement that is played back for viewing on the first display screen 104 at the media-playback device 202. In most cases, the time duration of the optimal time offset will be short enough to preserve a contextual linkage between the first display screen event or advertisement and the related, second-screen action so that a viewer will make the connection between the first-screen cause and the second-screen effect.

The advertising manager 102 can also determine more than one optimal time offset based on different criteria, such as the closest offset, the longest offset, the highest confidence offset, etc. The optimal time offset 122 can be determined based on several constraints, such as offset limits provided by an advertiser or offset preferences, such as the magnitude level of attention and a duration of attention level at a particular offset. For example, the advertising manager 102 can determine the optimal time offset 122 as a duration of time before or after the first-screen advertisement will playback for viewing on the first display screen 104 at the media-playback device 202.

In some implementations, the optimal time offset 122 can be determined based on viewer attention to the television content 204 at the media-playback device 202 that includes the advertisement (e.g., advertising content 206). The level of the viewer attention can indicate a low-interest moment in the television content 204, which also indicates likely viewer focus on the mobile device 212. The optimal time offset can also be determined based on collective viewer activity in social media, such as determined from the social-media indicators 234, determined based on viewer preferences and viewer reaction to previous events displayed for viewing on the second display screen 106 at the mobile device 212, or determined within an advertiser-designated time duration or other constraints.

The advertising manager 102 can also be implemented to determine the optimal time offset 122 based on viewer preferences, taking into account the usage history and capabilities of the second-screen device (e.g., the mobile device 212). For example, usage history may indicate that a user of the device is likely to disregard second-screen advertisement activity for a period of time when engaged in a particular activity or with a current application on the device 212. Alternatively or in addition, the device 212 may not download and store the advertising content 214 as fast as some other devices, and the optimal time offset would allow more time for advertising content download to the second-screen device 212.

The advertising manager 102 can initiate communication of the event notification 224 to the advertising client 222 at the mobile device 212 to initiate the second-screen event for viewing at the optimal time offset on the second display screen 106 at the mobile device 212. Advertising actions at the second-screen device 212 can include displaying the advertisement at the optimal time offset (e.g., either before or after the first-screen event or advertisement), removing the advertisement at that time offset, pricing the advertisement based on the time offset, rescheduling another advertisement based on the time offset, or adapting the advertisement content based on the time offset, such as to display different actions for the advertisement or different modalities of the advertisement.

Example methods 300, 500, and 700 are described with reference to respective FIGS. 3, 5, and 7 in accordance with embodiments, aspects, and features of the various advertisement systems described herein. Generally, any of the services, components, modules, methods, and operations can be implemented using software, firmware, hardware (e.g., fixed-logic circuitry), manual processing, or any combination thereof. A software implementation represents computer instructions that perform specified tasks when executed by a computer processing system. The example methods may be described in the general context of computer-executable instructions, which can include software, applications, programs, operations, components, modules, functions, and the like. The computer instructions can be stored in one or more computer-readable storage media devices, both local or remote to a computer processing system. The methods may also be practiced in a distributed environment by multiple computer or network devices. Further, the operations described herein are platform-independent and can be implemented on a variety of computing platforms with different processing systems.

Figure 3:
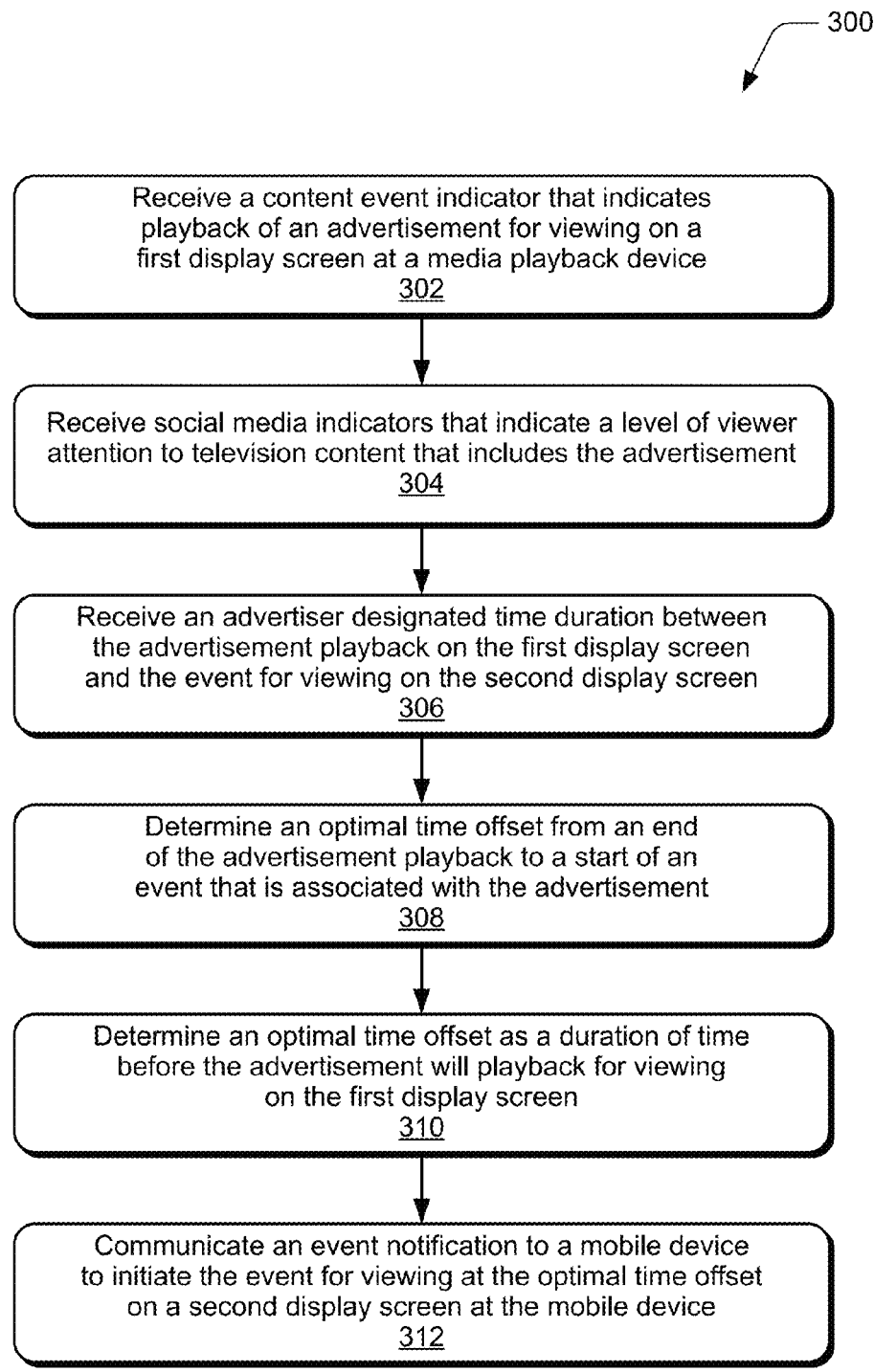
FIG. 3 illustrates an example method of attention-based, multi-screen advertisement scheduling in accordance with one or more embodiments.

FIG. 3 illustrates an example method 300 of attention-based, multi-screen advertisement scheduling and is generally described with reference to the example advertisement system 200 shown in FIG. 2. The order in which the method is described is not intended to be construed as a limitation, and any number or combination of the described method operations can be combined in any order to implement a method or an alternate method.

At 302, a content-event indicator is received that indicates playback of an advertisement for viewing on a first display screen at a media-playback device. For example, the advertising manager 102 in the advertisement system 200 (FIG. 2) receives the content-event indicator 220 that indicates playback of an advertisement for viewing on the first display screen 104 at the media-playback device 202. The content-event indicator 220 may indicate that the advertisement has been played back for viewing, has started playback, or will playback for viewing on the first display screen 104 at the media-playback device 202.

At 304, social-media indicators are received that indicate a level of viewer attention to television content that includes the advertisement. For example, the advertising manager 102 receives the social-media indicators 234 from any number of the various social-medias 236, where the social-media indicators indicate a level of collective viewer attention to the television content 204 that includes the advertisement (e.g., advertising content 206) for playback and viewing on the first display screen 104 at the media-playback device 202.

At 306, an advertiser-designated time duration is received, where the designated time duration is between the advertisement playback on the first display screen 104 and the event for viewing on the second display screen 106. For example, the advertising manager 102 receives an advertiser-designated time duration between the advertisement playback on the first display screen 104 at the media-playback device 202 and the event for viewing on the second display screen 106 at the mobile device 212.

At 308, an optimal time offset is determined from playback of the advertisement to a start of an event that is associated with the advertisement. For example, the advertising manager 102 determines the optimal time offset 122 from playback of the advertisement for viewing on the first display screen 104 at the media-playback device 202 to a start of the event that is associated with the advertisement. An event initiated for viewing on the second display screen 106 at the mobile device 212 can be a coordinated second-screen advertisement with the first-screen advertisement that is played back for viewing on the first display screen 104 at the media-playback device 202.

In some implementations, the optimal time offset 122 is determined by the advertising manager 102 based on viewer attention to television content that includes the advertisement, where a level of viewer attention indicates a low-interest moment in the television content and likely viewer focus on the mobile device 212. The optimal time offset can also be determined based on collective viewer activity in social media, such as determined from the social-media indicators 234, determined based on a viewer reaction to previous events displayed for viewing on the second display screen 106 at the mobile device 212, determined based on viewer preferences, or determined within the advertiser-designated time duration (received at 306).

At 310, an optimal time offset is determined as a duration of time before the advertisement will playback for viewing on the first display screen 104. As an alternative or in addition to the optimal time offset determined at 308, the advertising manager 102 determines the optimal time offset 122 as a duration of time before the advertisement will playback for viewing on the first display screen 104 at the media-playback device 202.

At 312, an event notification is communicated to a mobile device to initiate the event for viewing at the optimal time offset on a second display screen at the mobile device. For example, the advertising manager 102 initiates communication of the event notification 224 to the mobile device 212 to initiate the event for viewing at the optimal time offset on the second display screen 106 at the mobile device 212.

Figure 4:
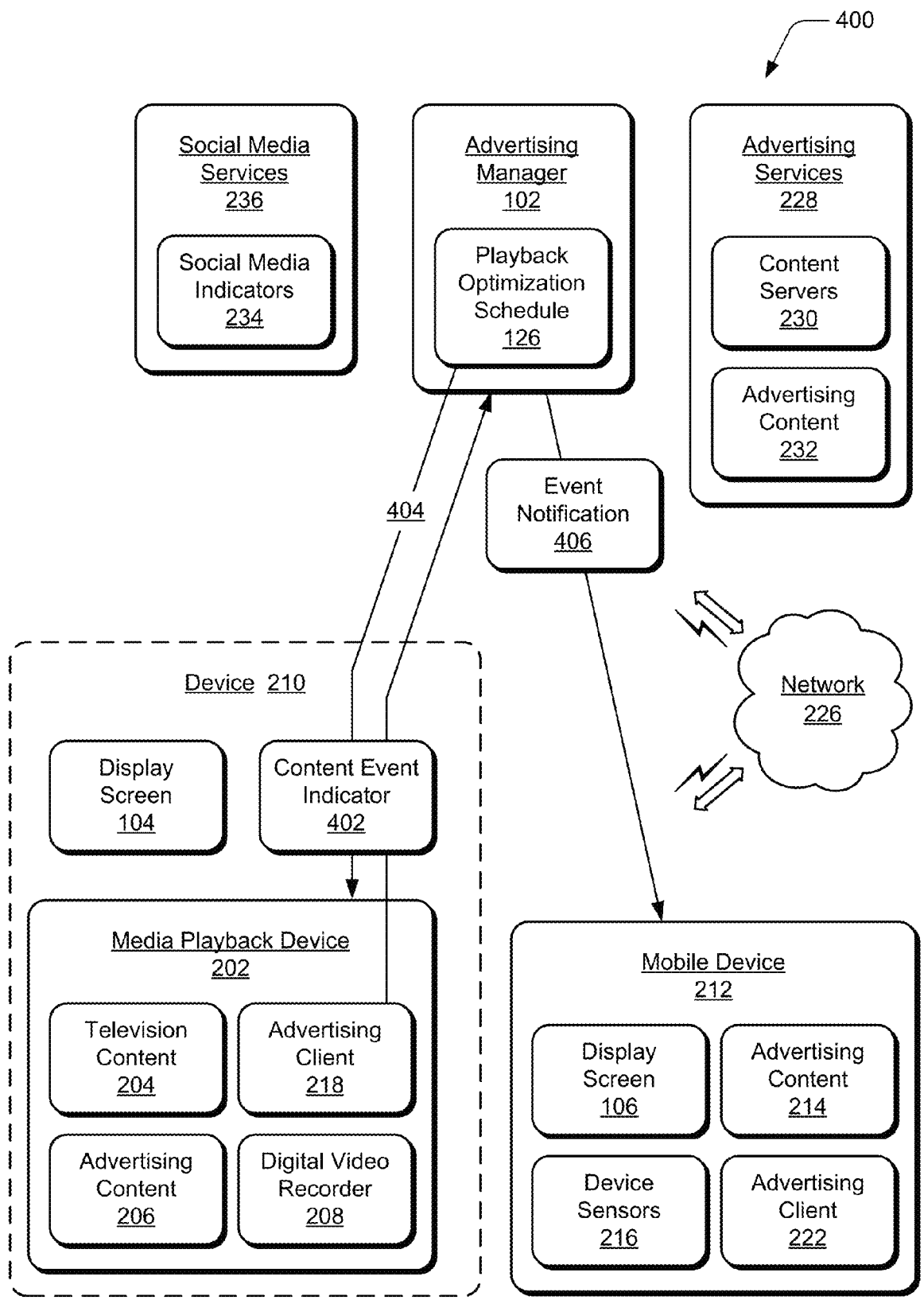
FIG. 4 illustrates an example advertisement system in which embodiments of attention-based advertisement scheduling in time-shifted content can be implemented.

FIG. 4 illustrates an example advertisement system 400 in which embodiments of attention-based advertisement scheduling in time-shifted content can be implemented. The example advertisement system 400 includes the advertising manager 102 that determines the playback optimization schedule 126 and includes the first display screen 104 and the second display screen 106 as described with reference to FIG. 1. This example advertisement system 400 also includes the media-playback device 202, the optional device 210 that integrates the media-playback device 202 and the display screen 104, and the mobile device 212 as shown and described with reference to FIG. 2. The advertisement system 400 also includes the advertising services 228, the social-media services 236, and the network 226, also described with reference to FIG. 2.

In some embodiments, the advertising manager 102 receives a content-event indicator 402 that indicates playback of recorded content for viewing at the media-playback device 202, where the recorded content includes advertisements in respective timeslots within the recorded content. For example, the media-playback device 202 can implement the digital video recorder 208 to maintain the television content 204 as recorded content that includes the advertising content 206, and the recorded content can be initiated for playback by a user of the device 202 at the convenience of the user.

The advertising manager 102 can then determine the playback optimization schedule 126 that includes replacing one or more of the advertisements during the playback of the recorded content or time-shifting one or more of the advertisements to alternate timeslots during the playback of the recorded content. In some implementations, the advertising manager 102 can determine the playback optimization schedule based on collective viewer activity in social media or levels of viewer attention to an initial distribution of the television content 204 in real time (e.g., as broadcast or multicast content) that is then recorded as the recorded content.

The levels of viewer attention to the initial distribution of the television content 204 (e.g., the real-time broadcast) can be based on the social-media indicators 234 at the time of the television-content distribution. For example, the placement of an advertisement for viewing as a first-screen event at the 12th minute of a television program may be determined to have been sub-optimal based on social-media feedback because increased viewer attention to the television program occurred around the 15th minute during the television program broadcast. Television content may have potential higher-interest moments, such as based on an injury in a sporting event, un-announced celebrity cameos, or real-life events that create unforeseen interest from viewers, and other interesting moments that are not predictable by an advertisement scheduler but that sustain viewer interest. By moving advertisement timeslots or creating new ones around the higher-interest moments in the recorded television content, overall advertisement effectiveness is increased and advertisement avoidance behaviors are reduced. Accordingly, an advertisement can be time-shifted to play back just before or after the more interesting portion of the recorded content that captures increased viewer attention.

The advertising manager 102 can generate the playback optimization schedule 126 to replace advertisements in the recorded content or to time-shift advertisements during playback of the recorded content. The playback optimization schedule 126 can also include new advertisement timeslots in the recorded content, or different pricing of the advertisement timeslots. The advertising manager 102 can also determine the playback optimization schedule 126 based in part on the optimal time offset 122, such as described with reference to FIGS. 2 and 3. The advertising manager 102 can determine the optimal time offset 122 as a duration of time before or after playback of an advertisement for viewing on the first display screen 104 at the media-playback device 202. The additional flexibility to be able to time-shift a first-screen device action or advertisement provides that an optimal time offset is more likely determinable without generating viewer attention conflicts between first-screen devices and second-screen devices when scheduling a second-screen event based on a first-screen action.

In some embodiments, one or more advertisements may also be split among different timeslots or time segments as spliceable advertisements depending on advertiser preferences. For example, an advertiser may develop story-telling advertisements that have specific segments and, as the advertisements are progressively played back for viewing, a story or use case is developed for the viewer. Further, episodic advertisements can also be developed in a similar scenario, where a set of specific advertisements are rescheduled to convey a story to a viewer during playback of the recorded content.

In some implementations, the media-playback device 202 can have stored a static advertisement playback schedule, e.g., one associated with the advertising content 204, and the advertisement playback schedule can include fixed timeslots and corresponding fixed prices. The media-playback device 202 may also include a synchronized advertisement playback schedule with adaptive pricing, such as for reserved timeslots and pricing adapted to advertisement constraints or to optimal time offsets. The media-playback device 202 can receive an elastic sync-ad (synchronized advertisement) schedule that includes offsets, which may conflict with the existing static or synchronized advertisement schedules at the playback device 202, create dead air in the existing synchronized advertisement schedule by moving an advertisement, or include additional scheduling constraints or preferences that are taken into account.

The advertising manager 102 can implement a combination of componentization and compensation algorithms (e.g., representative of strategies) to improve advertisement scheduling effectiveness. For example, componentization can be applied to split an advertisement into multiple smaller advertisement segments that can be more effectively scheduled. The compensation aspect can be applied to optimize the overall utility of all advertisements in a particular schedule to meet both quantity and quality advertiser metrics for advertisement impressions. The opportunity is in determining if a conflict advertisement can be componentized to create more placement with less conflict, such as to initially play back a short-form of the advertisement and then to playback a long-form of the advertisement at the next non-conflict, sub-optimal timeslot.

Additionally, the advertising manager 102 can determine whether a conflict advertisement can be compensated by auto-rescheduling a multiplicity of the advertisement instances, where effective quantity and quality of advertisement impression is restored. Accordingly, spliceable advertisements can be implemented for dynamic rescheduling of episodic advertisements within recorded, time-shifted content, implemented to split an advertisement across multiple shorter time slots if the advertisement lends itself to segment splits, or implemented to schedule short-form advertisements rather than long-form versions of the advertisements when available timeslots are either sub-optimal for the long-form version of an advertisement or would lead to an ineffective advertisement impression placement.

The advertising manager 102 can communicate the playback optimization schedule 126 to the media-playback device 202 (identified at 404) to reschedule or replace the advertisements in the recorded content during playback of the recorded content. Additionally, the advertising manager 102 communicates alternate advertisements or manages delivery of the alternate advertisements (e.g., the advertising content 232 maintained at the advertising services 228) to the media-playback device 202 to replace the advertisements stored at the media-playback device 202. The advertising manager 102 can also initiate communication of the event notification 406 to the advertising client 222 at the mobile device 212 to initiate a second-screen event for viewing at the optimal time offset on the second display screen 106 at the mobile device 212.

Figure 5:
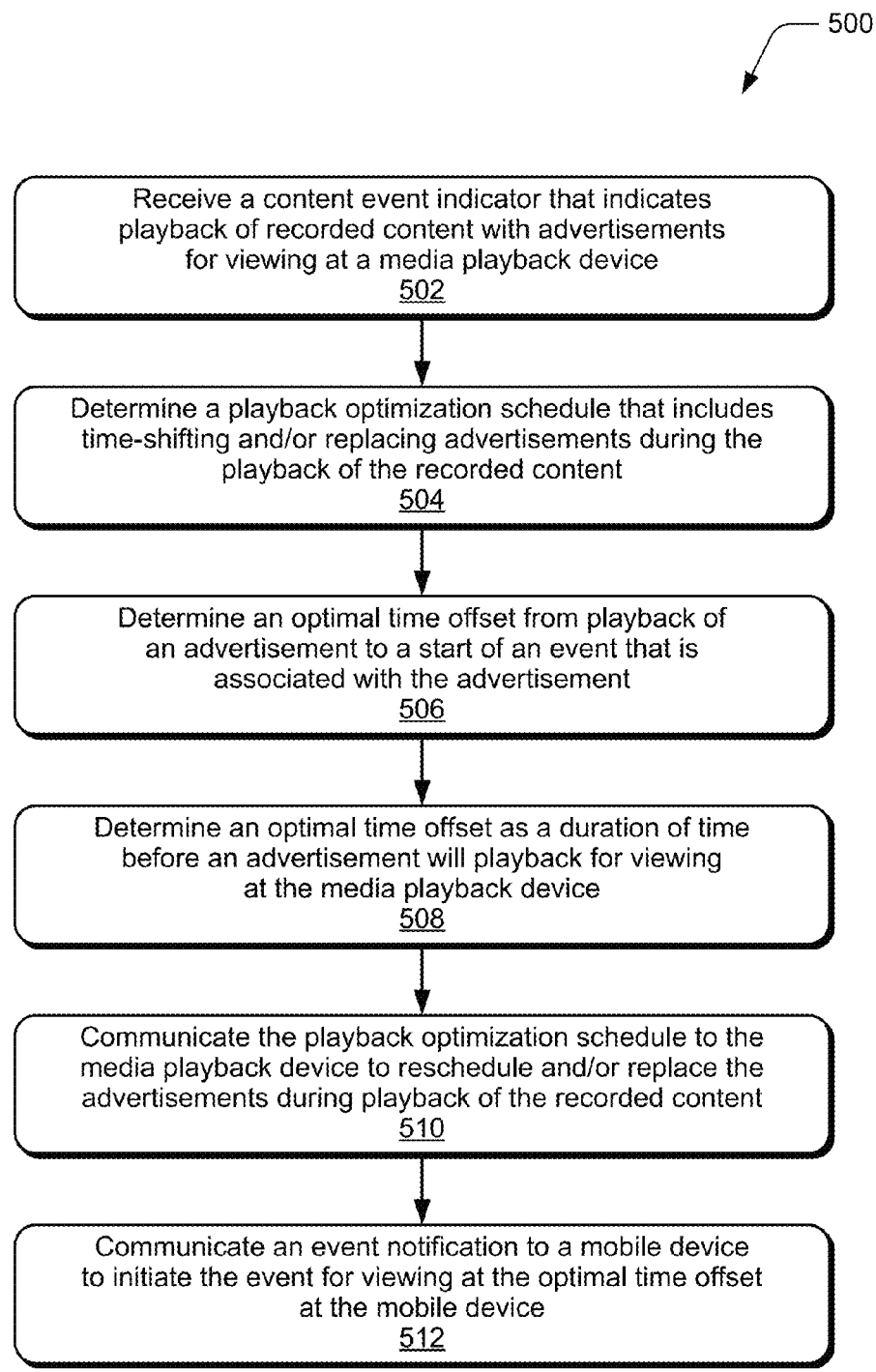
FIG. 5 illustrates an example method of attention-based advertisement scheduling in time-shifted content in accordance with one or more embodiments.

FIG. 5 illustrates an example method 500 of attention-based advertisement scheduling in time-shifted content and is generally described with reference to the example advertisement system 400 shown in FIG. 4. The order in which the method is described is not intended to be construed as a limitation, and any number or combination of the described method operations can be combined in any order to implement a method or an alternate method.

At 502, a content-event indicator is received that indicates playback of recorded content with advertisements for viewing at a media-playback device. For example, the advertising manager 102 in the advertisement system 400 (FIG. 4) receives the content-event indicator 402 that indicates playback of recorded content for viewing at the media-playback device 202, where the recorded content includes advertisements in respective timeslots in the recorded content.

At 504, a playback optimization schedule is determined that includes time-shifting or replacing advertisements during the playback of the recorded content. For example, the advertising manager 102 determines the playback optimization schedule 126 that includes replacing one or more of the advertisements during the playback of the recorded content or time-shifting one or more of the advertisements to alternate timeslots during the playback of the recorded content. In some implementations, the advertising manager 102 determines the playback optimization schedule based on collective viewer activity in social media or levels of viewer attention to an initial distribution of the television content 204 in real-time that is recorded as the recorded content. The levels of viewer attention to the initial distribution of the television content can be based on the social-media indicators 234. The advertising manager 102 can also determine the playback optimization schedule 126 based in part on an optimal time offset 122, such as described with reference to operations 506 and 508.

At 506, an optimal time offset is determined from playback of an advertisement to a start of an event that is associated with the advertisement. For example, the advertising manager 102 determines the optimal time offset 122 from playback of the advertisement for viewing on the first display screen 104 at the media-playback device 202 to a start of the event that is associated with the advertisement. An event initiated for viewing on the second display screen 106 at the mobile device 212 can be a coordinated advertisement with the first-screen advertisement that is played back for viewing on the first display screen 104 at the media-playback device 202.

At 508, an optimal time offset is determined as a duration of time before an advertisement will playback for viewing at the media-playback device. As an alternative or in addition to the optimal time offset determined at 506, the advertising manager 102 determines the optimal time offset 122 as a duration of time before the advertisement will playback for viewing on the first display screen 104 at the media-playback device 202.

At 510, the playback optimization schedule is communicated to the media-playback device to reschedule or replace the advertisements during playback of the recorded content. For example, the advertising manager 102 initiates communication of the playback optimization schedule 126 to the media-playback device 202 to reschedule or replace the advertisements in the recorded content during playback of the recorded content. Additionally, the advertising manager 102 communicates alternate advertisements, or manages delivery of alternate advertisements from the advertising services 228, to the media-playback device 202 to replace the advertisements stored at the media-playback device 202 (e.g., when implemented as a digital video recorder device 208).

At 512, an event notification is communicated to a mobile device to initiate the event for viewing at the optimal time offset at the mobile device. For example, the advertising manager 102 initiates communication of the event notification 406 to the mobile device 212 to initiate the event for viewing at the optimal time offset 122 on the second display screen 106 at the mobile device 212.

Figure 6:
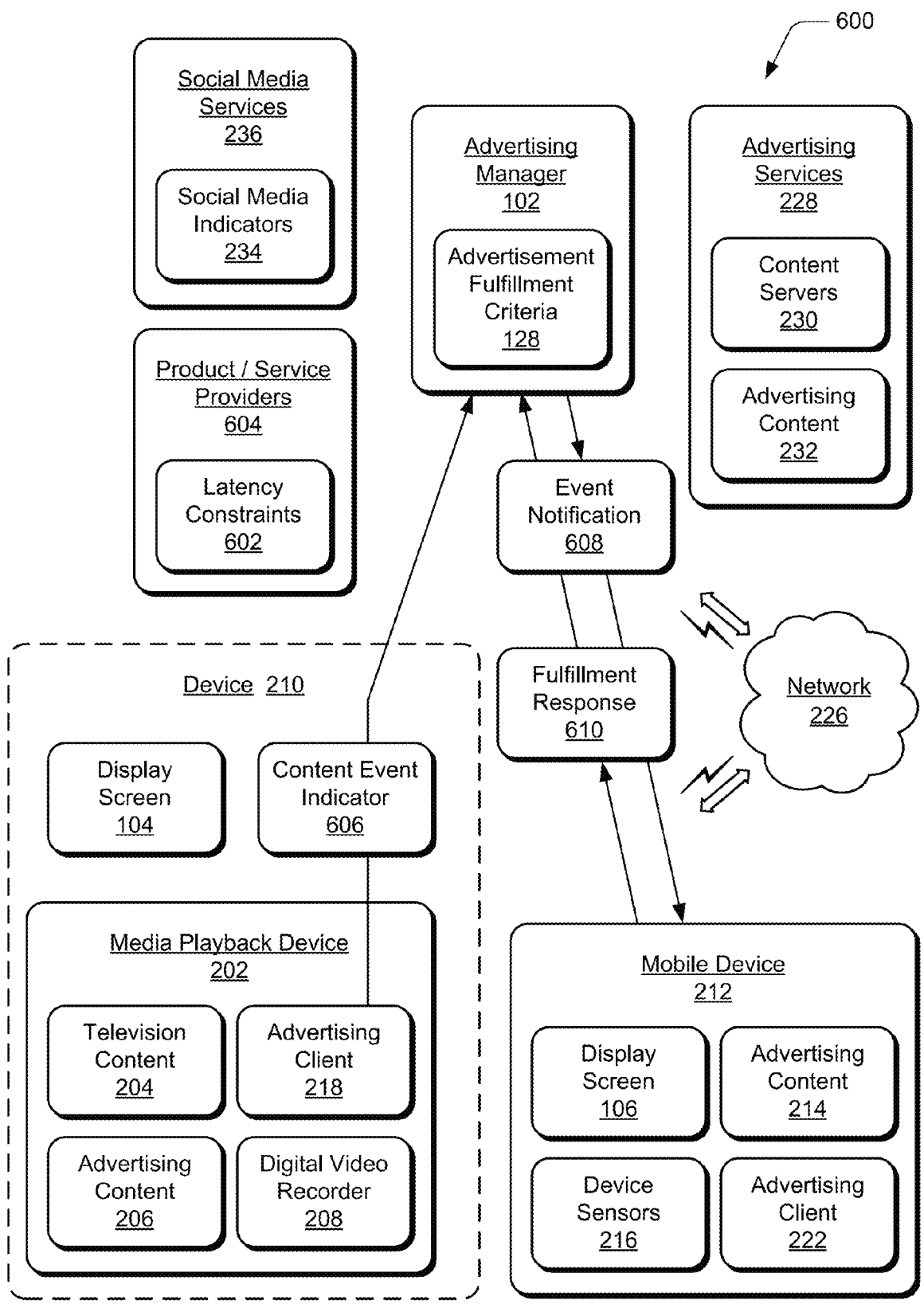
FIG. 6 illustrates an example advertisement system in which embodiments of multi-screen advertisement correlation based on purchases can be implemented.

FIG. 6 illustrates an example advertisement system 600 in which embodiments of multi-screen advertisement correlation based on purchases can be implemented. The example advertisement system 600 includes the advertising manager 102 that determines the advertisement-fulfillment criteria 128 and includes the first display screen 104 and the second display screen 106 as described with reference to FIG. 1. This example advertisement system 600 also includes the media-playback device 202, the optional device 210 that integrates the media-playback device 202 and the display screen 104, and the mobile device 212 as shown and described with reference to FIG. 2. The advertisement system 600 also includes the advertising services 228, the social-media services 236, and the network 226, also described with reference to FIG. 2.

In some embodiments, the advertising manager 102 receives latency constraints 602 that are associated with advertising events from product or service providers 604. The latency constraints 602 can include various indicators, such as an advertising effectiveness when a product or service is offered as a second-screen device advertisement, a history of viewer redemption actions initiated at the mobile device 212, or an expectation of viewer response to the second-screen advertisement at the mobile device 212. A latency constraint 602 may also include a time-sensitive component of a second-screen advertisement. The advertising manager 102 can then determine the advertisement-fulfillment criteria 128, which indicate a duration of time within which fulfillment of a product or service is expected when offered as a second-screen advertisement that corresponds to a first-screen action or advertisement.

For example, an advertising campaign may include offering a fulfillment criteria with a second display screen advertisement or event, such as a coupon that includes a time-based or quantity-based constraint. A pizza company may offer discount pricing and free delivery within a particular region (e.g., a city or zip code) if an order is placed within the next thirty minutes (e.g., a time-based constraint) or until a specified number of pizzas have been ordered at the discount price (e.g., a quantity-based constraint). An advertisement-fulfillment criterion for an offer can be tied specifically to a synchronized action that is generated in response to a known first-screen content event. This allows localized, user-specific criteria related to the fulfillment to be considered in both the delivery of the second-screen synchronized action (i.e., the second-screen advertisement) and the actual redemption of the product or service that is tied to that action.

The advertising manager 102 can also determine the advertisement-fulfillment criteria 128 based in part on the optimal time offset 122, such as described with reference to FIGS. 2 and 3. The advertising manager 102 can determine the optimal time offset 122 from playback of a first-screen advertisement for viewing on the first display screen 104 at the media-playback device 202 to the playback of a second-screen advertisement that includes the fulfillment criteria on the second display screen 106 at the mobile device 212. Further, the optimal time offset 122 can be determined as a duration of time before or after playback of the first-screen advertisement for viewing on the first display screen 104 at the media-playback device 202.

The advertising manager 102 can receive the content-event indicator 606 that indicates playback of the first-screen advertisement for viewing on the first display screen 104 at the media-playback device 202. The advertising manager 102 can then initiate communication of the event notification 608 to the mobile device 212 to initiate the second-screen advertisement that includes the advertisement-fulfillment criteria 128 for viewing on the second display screen 106 at the mobile device 212.

The advertising manager 102 may also receive a fulfillment response 610 from the advertising client 222 at the mobile device 212, where the fulfillment response indicates a viewer input at the mobile device 212 to redeem an offer of the product or service in the second-screen advertisement (e.g., based on the advertisement-fulfillment criteria 128). The advertising manager 102 can then initiate communication of fulfillment-response analytics back to the provider 604 of the product or service.

Figure 7:
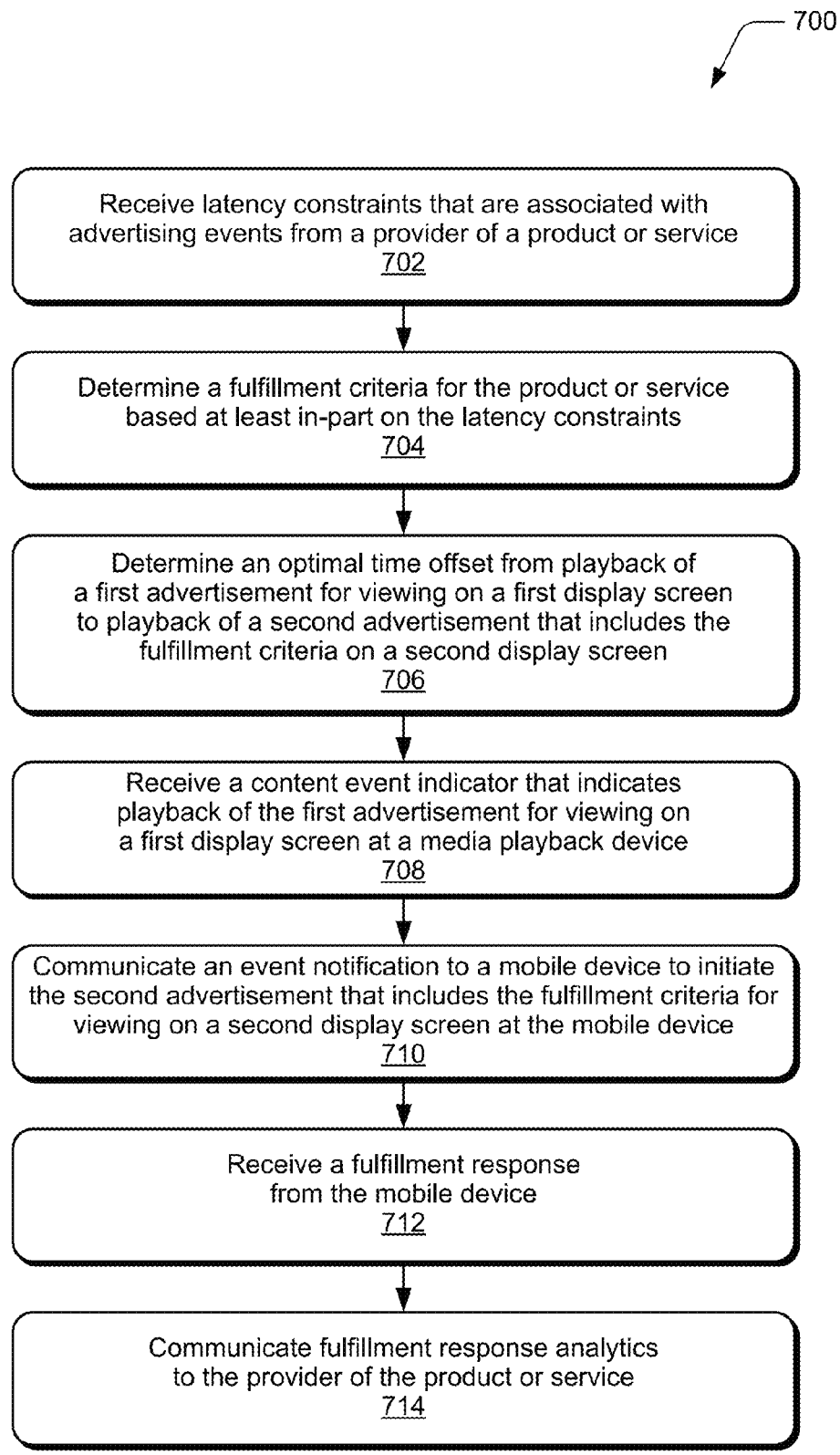
FIG. 7 illustrates an example method of multi-screen advertisement correlation based on purchases in accordance with one or more embodiments.

FIG. 7 illustrates an example method 700 of multi-screen advertisement correlation based on purchases and is generally described with reference to the example advertisement system 600 shown in FIG. 6. The order in which the method is described is not intended to be construed as a limitation, and any number or combination of the described method operations can be combined in any order to implement a method or an alternate method.

At 702, latency constraints that are associated with advertising events are received from a provider of a product or service. For example, the advertising manager 102 in the advertisement system 600 (FIG. 6) receives the latency constraints 602 from a product or service provider 604. The latency constraints 602 can include various indicators, such as an advertising effectiveness when a product or service is offered as a second-screen advertisement, a history of viewer-redemption actions initiated at the mobile device 212, or an expectation of viewer response to the second-screen advertisement that includes the fulfillment criteria at the mobile device 212.

At 704, a fulfillment criteria for the product or service is determined based at least in part on the latency constraints. For example, the advertising manager 102 determines the advertisement-fulfillment criteria 128 which indicate a duration of time within which fulfillment of the product or service is expected when offered as the second-screen advertisement that corresponds to a first-screen advertisement. In some implementations, the advertising manager 102 can determine the advertisement-fulfillment criteria 128 based in part on the optimal time offset 122, such as described with reference to operation 706.

At 706, an optimal time offset is determined from playback of a first advertisement for viewing on a first display screen to playback of a second advertisement that includes the fulfillment criteria on a second display screen. For example, the advertising manager 102 determines the optimal time offset 122 from playback of a first advertisement for viewing on the first display screen 104 at the media-playback device 202 to playback of a second advertisement that includes the advertisement-fulfillment criteria 128 on the second display screen 106 at the mobile device 212. The advertising manager 102 can determine the optimal time offset 122 to playback the second-screen advertisement for viewing as a duration of time after the first-screen advertisement is played back for viewing on the first display screen 104 or as a duration of time before the first-screen advertisement will playback for viewing on the first display screen 104.

At 708, a content-event indicator is received that indicates playback of the first advertisement for viewing on a first display screen at a media-playback device. For example, the advertising manager 102 receives the content-event indicator 606 from the advertising client 218 at the media-playback device 202, and the content-event indicator indicates playback of the first advertisement for viewing on the first display screen 104 at the media-playback device 202.

At 710, an event notification is communicated to a mobile device to initiate the second advertisement that includes the fulfillment criteria for viewing on a second display screen at the mobile device. For example, the advertising manager 102 initiates communication of the event notification 608 to the mobile device 212 to initiate the second-screen advertisement that includes the advertisement-fulfillment criteria 128 for viewing on the second display screen 106 at the mobile device 212.

At 712, a fulfillment response is received from the mobile device. For example, the advertising manager 102 receives the fulfillment response 610 from the advertising client 222 at the mobile device 212, where the fulfillment response indicates a viewer input at the mobile device 212 to redeem an offer of the product or service in the second-screen advertisement (e.g., based on the advertisement-fulfillment criteria 128). At 714, fulfillment-response analytics are communicated to the provider of the product or service. For example, the advertising manager 102 initiates communication of fulfillment-response analytics back to the provider 604 of the product or service.

Figure 8:
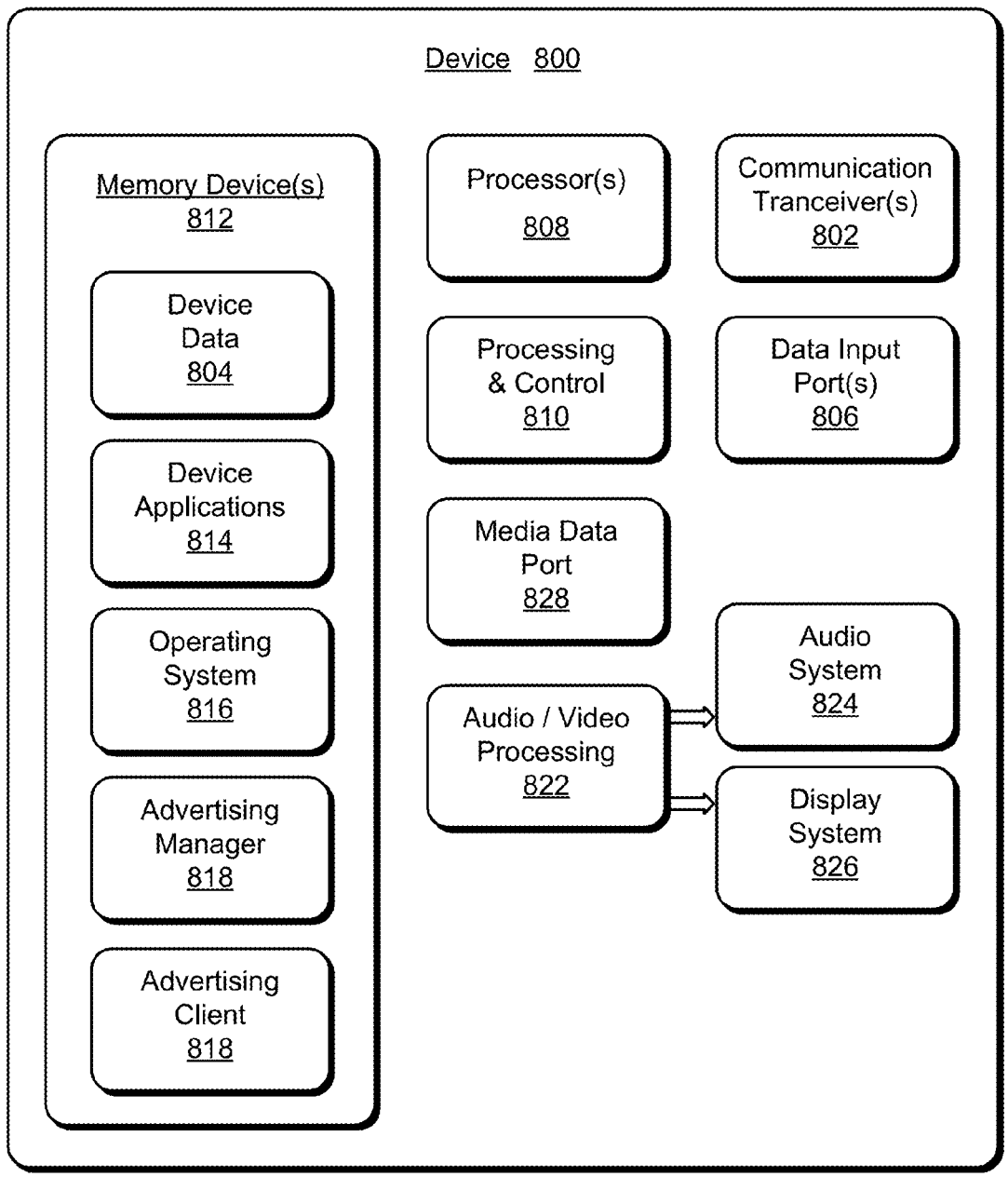
FIG. 8 illustrates various components of an example device that can be implemented in the example advertisement systems in accordance with one or more embodiments.

FIG. 8 illustrates various components of an example device 800 that can be implemented as any device, server, or network device described with reference to any of the previous FIGS. 1 through 7. In some embodiments, the example device may be implemented as a content server, media-playback device, or mobile device, such as described with reference to FIGS. 1 through 7. Alternatively or in addition, the device may be implemented in any form of device that can receive and play back television and advertising content, such as any one or combination of a communication, computer, playback, gaming, entertainment, mobile phone, or tablet computing device.

The device 800 includes communication transceivers 802 that enable wired or wireless communication of device data 804, such as received data, data being received, packets of data, etc. Example transceivers include wireless personal area network radios compliant with various IEEE 802.15 standards, wireless local area network radios compliant with any of the various IEEE 802.11 standards, wireless wide area network radios for cellular telephony, wireless metropolitan area network radios compliant with various IEEE 802.15 standards, and wired local area network Ethernet transceivers.

The device 800 may also include one or more data-input ports 806 via which any type of data, media content, or inputs can be received, such as user-selectable inputs, messages, music, television content, recorded content, and any other type of audio, video, or image data received from any content or data source. The data-input ports may include USB ports, coaxial-cable ports, and other serial or parallel connectors (including internal connectors) for flash memory, DVDs, CDs, and the like. These data-input ports may be used to couple the device to components, peripherals, or accessories such as microphones or cameras.

The device 800 includes one or more processors 808 (e.g., any of microprocessors, controllers, and the like) or a processor and memory system (e.g., implemented in an SoC) that processes computer-executable instructions. A processing system may be implemented at least partially in hardware, which can include components of an integrated circuit or on-chip system, an application-specific integrated circuit, a field-programmable gate array, a complex programmable logic device, and other implementations in silicon or other hardware. Alternatively or in addition, the device can be implemented with any one or combination of software, hardware, firmware, or fixed-logic circuitry that is implemented in connection with processing and control circuits, which are generally identified at 810. Although not shown, the device 800 can include a system bus or data transfer system that couples the various components within the device 800. A system bus can include any one or combination of different bus structures, such as a memory bus or memory controller, a peripheral bus, a universal serial bus, or a processor or local bus that utilizes any of a variety of bus architectures.

The device 800 also includes one or more memory devices 812 that enable data storage, examples of which include random-access memory, non-volatile memory (e.g., read-only memory, flash memory, EPROM, EEPROM, etc.), and a disk storage device. A disk storage device may be implemented as any type of magnetic or optical storage device, such as a hard disk drive, a recordable or rewriteable disc, any type of DVD, and the like. The device 800 may also include a mass storage media device.

A memory device 812 provides data storage mechanisms to store the device data 804, other types of information or data, and various device applications 814 (e.g., software applications). For example, an operating system 816 can be maintained as software instructions within a memory device and executed on the processors 808. The device applications may also include a device manager, such as any form of a control application, software application, signal-processing and control module, code that is native to a particular device, a hardware-abstraction layer for a particular device, and so on. The device may also include an advertising manager 818, such as the advertising manager 102, and the device may include an advertising client 818, such as when the device is implemented as a media-playback device (e.g., a first-screen device) or as a mobile device (e.g., a second-screen device) as described with reference to FIGS. 1 through 7.

The device 800 also includes an audio or video processing system 822 that generates audio data for an audio system 824 or generates display data for a display system 826. The audio system 824 or the display system 826 may include any devices that process, display, or otherwise render audio, video, display, or image data. Display data and audio signals can be communicated to an audio component or to a display component via a radio frequency link, S-video link, High-Definition Multimedia Interface, composite video link, component video link, Digital Video Interface, analog audio connection, or other similar communication link, such as the media data port 828. In some implementations, the audio system 824 or the display system 826 are integrated components of the example device 800.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. An advertisement system comprising:
a mobile device;
a media playback device;
a processing system to implement an advertising manager that is configured to:
receive a content-event indicator that indicates playback of an advertisement for viewing on a first display screen at the media-playback device;
determine an optimal time offset from playback of the advertisement for viewing on the first display screen at the media-playback device to a start of an event that is associated with the advertisement;

initiate communication of an event notification to the mobile device to initiate the event for viewing at the optimal time offset on a second display screen at the mobile device;

initiate communication of fulfillment-response analytics back to a provider of a product or service;

wherein the advertising manager is configured to determine the optimal time offset based on viewer attention to television content that includes the advertisement;

wherein a level of the viewer attention includes: 1) social-media indicators; and 2) a low-interest moment in the television content on the media-playback device and likely viewer focus on the mobile device;

when the level of the viewer attention indicates the low-interest moment in the television content and the likely viewer focus on the second display screen at the mobile device, the advertising manager is configured to determine the optimal time offset;

when the level of the viewer attention is based on the social-media indicators, the advertising manager is configured to determine the optimal time offset;

when there are viewer preferences, the advertising manager is configured to determine the optimal time offset;

wherein the social-media indicators include tweets, likes, and check-ins, wherein the advertising manager is configured to determine the optimal time offset within an advertiser-designated time duration between the advertisement playback on the first display screen at the media-playback device and the event for viewing on the second display screen at the mobile device;

wherein the event initiated for viewing on the second display screen at the mobile device is a coordinated-advertisement with the advertisement played back for viewing on the first display screen; and wherein the fulfillment-response is received from the mobile device indicating a viewer input at the mobile device to redeem an offer of the product or the service in the coordinated-advertisement.

2. A method comprising:

receiving a content-event indicator that indicates playback of an advertisement for viewing on a first display screen at a media-playback device;

determining an optimal time offset from playback of the advertisement for viewing on the first display screen at the media-playback device to a start of an event that is associated with the advertisement;

communicating an event notification to a mobile device to initiate the event for viewing at the optimal time offset on a second display screen at the mobile device;

receiving an advertiser-designated time duration between the advertisement playback on the first display screen at the media-playback device and the event for viewing on the second display screen at the mobile device;

determining the optimal time offset based on viewer attention to television content that includes the advertisement;

communicating fulfillment-response analytics back to a provider of a product or a service;

wherein a level of the viewer attention includes: 1) social-media indicators; and 2) a low-interest moment in the television content on the media-playback device and likely viewer focus on the mobile device;

when the level of the viewer attention indicates the low-interest moment in the television content and the likely viewer focus on the second display screen on the mobile device, the optimal time offset is determined;

when the level of the viewer attention is based on the social-media indicators, the optimal time offset is determined;

when viewer preferences exist, the optimal time offset is determined;

wherein the social-media indicators include tweets, likes, and check-ins;

wherein the optimal time offset is determined within the advertiser-designated time duration;

wherein the event for viewing on the second display screen at the mobile device is a coordinated-advertisement with the advertisement played back for viewing on the first display screen; and wherein the fulfillment-response is received from the mobile device indicating a viewer input at the mobile device to redeem an offer of the product or the service in the coordinated-advertisement.

3. A method comprising:

receiving a content-event indicator that indicates an advertisement will playback for viewing on a first display screen at a media-playback device;

determining an optimal time offset as a duration of time before the advertisement will playback for viewing on the first display screen at the media-playback device;

communicating an event notification to a mobile device to initiate an event that is associated with the advertisement for viewing at the optimal time offset on a second display screen at the mobile device;

receiving an advertiser-designated time duration between the advertisement playback on the first display screen at the media-playback device and the event for viewing on the second display screen at the mobile device;

determining the optimal time offset based on viewer attention to television content that includes the advertisement;

communicating of fulfillment-response analytics back to a provider of a product or a service;

wherein a level of the viewer attention includes: 1) social-media indicators; and 2) a low-interest moment in the television content on the media-playback device and likely viewer focus on the mobile device;

when the level of the viewer attention indicates the low-interest moment in the television content and the likely viewer focus on the second display screen of the mobile device, the optimal time offset is determined;

when the level of the viewer attention is based on the social-media indicators, the optimal time offset is determined;

when there are viewer preferences, the optimal time offset is determined;

wherein the social-media indicators include tweets, likes, and check-ins;

wherein the optimal time offset is determined within the advertiser-designated time duration;

wherein the event for viewing on the second display screen at the mobile device is a coordinated-advertisement with the advertisement played back for viewing on the first display screen; and wherein the fulfillment-response is received from the mobile device indicating a viewer input at the mobile device to redeem an offer of the product or the service in the coordinated-advertisement.

\* \* \* \* \*